United States Patent [19]

Parker

[11] 4,387,573
[45] Jun. 14, 1983

[54] TURBOCHARGER MODULE FOR INTERNAL COMBUSTION ENGINE

[76] Inventor: Martin G. Parker, 4865 Pasadena Ave., Sacramento, Calif. 95841

[21] Appl. No.: 215,506

[22] Filed: Dec. 11, 1980

[51] Int. Cl.³ .......................................... F02B 33/44
[52] U.S. Cl. ...................................................... 60/611
[58] Field of Search ................ 60/611, 600, 601, 605; 123/559, 564

[56] References Cited

U.S. PATENT DOCUMENTS

| | | | |
|---|---|---|---|
| 2,777,632 | 1/1957 | Kishline | 60/605 |
| 2,839,038 | 6/1958 | Middlebrooks | 123/559 |
| 3,651,636 | 3/1972 | Glassey | 60/611 |
| 3,868,822 | 3/1975 | Keller | 60/611 |
| 3,910,049 | 10/1975 | Lloyd | 60/605 |
| 4,150,545 | 4/1979 | Yamazaki | 60/611 |

FOREIGN PATENT DOCUMENTS 53-137322 11/1978 Japan ................................. 123/559

*Primary Examiner*—Douglas Hart
*Attorney, Agent, or Firm*—Melvin R. Stidham

[57] ABSTRACT

A turbocharger for an internal combustion engine having, essentially, a one-piece housing with an intake port on top and an outlet port on the bottom. Both ports are surrounded by standard carburetor flanges so that the carburetor may be removed from the engine and mounted directly on the turbocharger and then the entire assembly mounted on the engine as a unit, with the turbocharger intermediate the carburetor and the engine. A generally horizontal passageway extends from the inlet opening to the axial inlet of a turbine compressor, and the compressed air/fuel mixture is projected radially downward through the discharge port. A bypass port opens through the bottom of the horizontal passageway directly to the discharge port, and a shut-off valve there is held open at low engine loads as the compressor turbine gains velocity, being driven by the exhaust gases.

2 Claims, 2 Drawing Figures

TURBOCHARGER MODULE FOR INTERNAL COMBUSTION ENGINE

BACKGROUND OF THE INVENTION

There are presently available turbochargers for internal combustion engines, but same require hoses, special exhaust manifolds, special inlet and discharge ducts and the like. The provision of hoses, of course, is tantamount to providing greater volume capacity for the air/fuel mixture and, hence, greatly increases the risk of premature explosion, i.e. "backfire". Moreover, the turbocharger units are primarily intended to boost the power of the engine at high load with the result that the engine operation at idle and low loads is extremely rough. Also, with hosing and other connections, it is difficult to avoid the occurence of low spots wherein the air/fuel mixture tends to "puddle", increasing the danger of explosion.

OBJECTS OF THE INVENTION

It is an object of this invention to provide a turbocharger for an internal combustion engine which eliminates the risk of premature explosion due to accumulation of air/fuel mixture.

It is a further object of this invention to provide a turbocharger for an internal combustion engine which requires no hoses or special fittings.

It is a further object of this invention to provide a turbocharger for an internal combustion engine which will provide a smooth transition from aspirated air/fuel entry to a supercharged delivery.

Other objects and advantages of this invention will become apparent from the description to follow, particularly when read in conjunction with the accompanying drawing.

SUMMARY OF THE INVENTION

In carrying out this invention, I provide a turbocharger unit which is essentially a one-piece housing comprising an upwardly disposed intake port, a generally horizontal flow passage to the axial inlet of a vertical compressor turbine which discharges radially downwardly through a discharge port. Both the intake and discharge ports are surrounded by standard carburetor flanges so that the carburetor may be removed from an engine and mounted on the intake port and the entire assembly mounted as a unit on the engine. Extending downward from the horizontal flow passage is a bypass port in which is disposed a butterfly valve the operation of which is related to that of the curburetor throttle valve. That is, the bypass valve is open during low load conditions, as at idle and modest engine speeds. Attached to the turbine compressor is a rotary impeller which is driven by the exhaust gases so that the turbine compressor starts to rotate on startup although it is being bypassed by the air/fuel mixture, which is delivered to the intake manifold by normal aspiration. Then, as engine loads calling for turbocharger operation are approached, by bypass butterfly moves toward closed position, and an ever-increasing percentage of the air/fuel mixture is delivered directly to the already rotating turbine compressor to provide a smooth transition. Finally, at high engine loads the entire air/fuel mixture is compressed.

DESCRIPTION OF A PREFERRED EMBODIMENT

Figure 1:
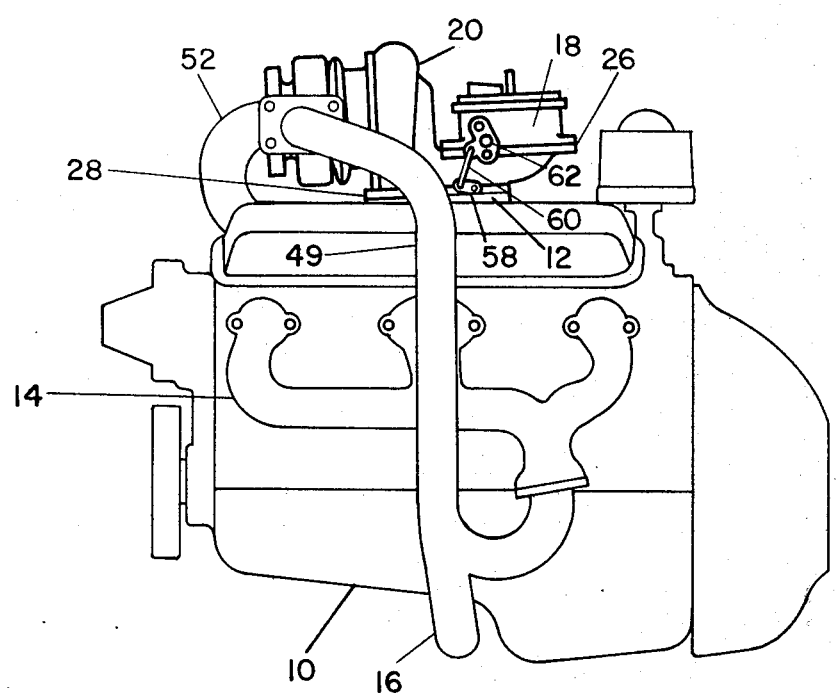
FIG. 1 is a side view of an internal combustion engine with my turbocharger in place.

Referring now to the drawing with greater particularity, there is shown an internal combustion engine 10 with intake manifold 12, exhaust manifold 14, exhaust crossover pipe 16 and a carbureter 18. Interposed between the carbureter 18 and the intake manifold 12 is the turbocharger module 20 of this invention.

Figure 2:
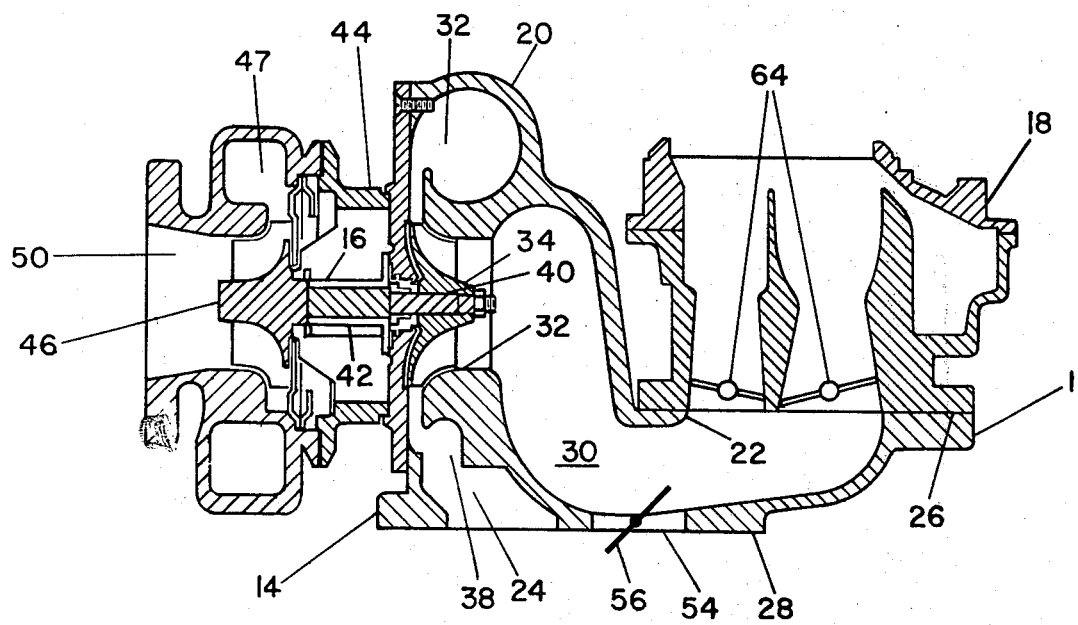
FIG. 2 is a vertical section view of my turbocharger unit with carburetor mounted thereon.

As shown in FIG. 2, the turbocharger module 20 includes an intake port 22 and a discharge port 24, both of which are surrounded by standard carbureter flanges 26 and 28 which will fit most, if not all, automotive engines currently available. Hence, the carburetor 18 may be removed from an internal combustion engine and mounted on the intake port flange 26; and then the entire assembly is mounted as a unit on the intake manifold 12 on flange 28.

From the intake port 22 a flow passageway 30 extends generally horizontally and then upwardly to flow axially into the inlet port 32 of a turbocharger compressor turbine 34 mounted in a compressor module 20 to exit at 38 into the discharge port 24.

The compressor 34 is mounted on a shaft 40, which is rotatably mounted in a rotary bearing 42 carried in a bearing housing 44 bolted to the end of the turbocharger module 20. Carried on the other end of the shaft is a turbocharger turbine impeller 46 which is driven by exhaust gases, the exhaust gases are projected radially inward at 47 from input pipe 49 (FIG. 1) to drive the impeller 46, the gas then being exhausted at 50 through exhaust pipe 52.

Opening from the bottom of the flow passageway 30 is a bypass port 54 in which is mounted a bypass valve 56, which may be of the conventional butterfly type. The butterfly valve 56 may be operated by a small arm 58 (FIG. 1) which is linked at 60 to the conventional bell crank lever 62 which operates the carburetor throttle valves 64. The link 60 is set so that at low engine loads, as when the engine is idling or at relatively low speeds, the butterfly valve 56 is in open position, whereby the air/fuel mixture from the carburetor 18 will simply bypass the turbine 34 and flow directly through the exhaust port 54 into the intake manifold. While the arm 58 and link 60 are illustrated, it is obvious that the butterfly valve may be controlled by, or related to, the carburetor 18 by suitable vacuum. It is to be noted that, with the bypass port 54 located as shown, at the low point of the flow passageway 30, there is no place for the air/fuel mixture to accumulate and, instead, will flow directly into the intake manifold.

Then, as speeds increase, the butterfly 56 gradually closes so that a gradually decreasing portion of the air/fuel mixture will be bypassed, and a gradually increasing portion will be compressed at the turbine 34 for supercharging. Hence, there is a smooth transition from the normal, aspirated intake to a pressurized delivery of a compressed mixture.

In the meantime, the turbine 34 itself commences rotation almost immediately, as exhaust gases are fed through the pipe 48. Hence when, supercharged air/f- uel mixture is required, and the bypass valve 56 moves toward closed portion, the flow of the mixture is to an already-rotating turbine to effect a smooth transition. The compressor turbine simply takes over and does effective work when needed.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A turbocharger for an internal combustion engine comprising:

a one-piece housing;

an upwardly directed intake port and a downwardly directed discharge surface in said housing;

first and second standard carburetor flanges around said intake port and discharge surface, respectively, so that a carburetor may be mounted directly thereon to feed an air/fuel mixture therein, and said housing may be mounted on the intake manifold of an internal combustion engine to discharge therein;

means in said housing forming a flow passage extending downward from said intake port in the configuration of a U-trap terminating in a horizontal outlet duct opening through one end of said housing;

a compressor delivery passageway in said housing extending upward from said outlet duct and then around it to a bottom port opening through said discharge surface;

a wall closure on said one end of the housing;

a horizontal shaft rotatable in said wall;

a turbine compressor on said shaft on the inside of said wall and disposed coaxially within said horizontal outlet duct;

a turbine impeller on said shaft on the outside of said wall;

a turbine housing on the outside of said wall and containing said impeller;

an inlet port in said turbine housing adapted to be connected to the exhaust manifold of an internal combustion engine;

a bypass port in said housing opening from the lowest level of said U-trap flow passage through said discharge surface;

a shut-off valve in said bypass port; and means operative to open said shut-off valve at low engine loads.

2. The turbocharger defined by claim 1 wherein said last-named means comprises:

a link operating said shut-off valve and adapted to be connected to the operating linkage of a carburetor throttle valve.

* * * * *